US011318939B2

(12) United States Patent
Oh

(10) Patent No.: US 11,318,939 B2
(45) Date of Patent: *May 3, 2022

(54) APPARATUS AND A METHOD FOR CONTROLLING AN INTER-VEHICLE DISTANCE

(71) Applicant: MANDO CORPORATION, Pyeongtaek-si (KR)

(72) Inventor: ChangBeom Oh, Seoul (KR)

(73) Assignee: Mando Mobility Solutions Corporation, Pyeongtaek-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/028,149

(22) Filed: Sep. 22, 2020

(65) Prior Publication Data

US 2021/0001848 A1 Jan. 7, 2021

Related U.S. Application Data

(63) Continuation of application No. 16/411,643, filed on May 14, 2019, now Pat. No. 10,807,596.

(30) Foreign Application Priority Data

May 17, 2018 (KR) .......................... 10-2018-0056451

(51) Int. Cl.
*B60W 30/16* (2020.01)
*B60W 30/09* (2012.01)
*B60W 30/095* (2012.01)

(52) U.S. Cl.
CPC ............ *B60W 30/16* (2013.01); *B60W 30/09* (2013.01); *B60W 30/0956* (2013.01);
(Continued)

(58) Field of Classification Search
CPC .. B60W 30/16; B60W 30/09; B60W 30/0956; B60W 2554/801;
(Continued)

(56) References Cited

U.S. PATENT DOCUMENTS 6,114,951 A 9/2000 Kinoshita et al.
2004/0064260 A1 4/2004 Padmanabhan
(Continued)

FOREIGN PATENT DOCUMENTS

CN 103171554 A 6/2013
CN 105966396 A 9/2016
(Continued)

OTHER PUBLICATIONS

Korean Office Action dated Dec. 4, 2018 issued in Korean Patent Application No. 10-2018-0056451.
(Continued)

*Primary Examiner* — Marthe Y Marc-Coleman
(74) *Attorney, Agent, or Firm* — Morgan, Lewis & Bockius LLP

(57) ABSTRACT

Disclosed are an apparatus and a method for controlling an inter-vehicle distance. Particularly, the apparatus for controlling an inter-vehicle distance may include one or more sensors, configured to detect one or more forward targets in front of a host vehicle, and a controller, configured to control the host vehicle to drive while maintaining a predetermined first inter-vehicle distance from a first target that drives on the driving road of the host vehicle. Therefore, according to the present disclosure, there are provided an apparatus and a method for controlling an inter-vehicle distance, which may more stably perform longitudinal control of a host vehicle while the host vehicle drives.

18 Claims, 17 Drawing Sheets

(52) U.S. Cl.
CPC ... *B60W 2420/42* (2013.01); *B60W 2554/801* (2020.02); *B60W 2754/30* (2020.02)

(58) Field of Classification Search
CPC ......... B60W 2754/30; B60W 2420/42; B60W 2554/4041; B60W 2554/802; B60W 30/095; B60W 2554/00; B60W 30/08; B60W 30/18163; B60Q 5/00
See application file for complete search history.

(56) References Cited

U.S. PATENT DOCUMENTS

| | | | |
|---|---|---|---|
| 2008/0178713 A1 | 7/2008 | Long | |
| 2014/0292545 A1 | 10/2014 | Nemoto | |
| 2015/0166025 A1* | 6/2015 | Nagatsuka | B60W 30/188 701/70 |
| 2015/0183430 A1* | 7/2015 | Schwindt | B60W 30/09 701/23 |
| 2018/0118099 A1 | 5/2018 | Kunii | |

FOREIGN PATENT DOCUMENTS

| | | |
|---|---|---|
| DE | 102009048061 A1 | 4/2011 |
| JP | 3695296 B2 | 7/2005 |
| JP | 2007-186141 A | 7/2007 |
| JP | 2017-154614 A | 9/2017 |
| JP | 2018-002083 A | 1/2018 |
| KR | 10-2014-0084960 A | 7/2014 |
| KR | 10-1762805 B1 | 7/2017 |

OTHER PUBLICATIONS

Notice of Allowance dated Korean Patent Application No. 10-2019-0047255 dated May 15, 2019 (with English abstract).
Notice of Allowance dated Jun. 19, 2020 in U.S. Appl. No. 16/411,643.
Non-Final Office Action dated Mar. 6, 2020 in U.S. Appl. No. 16/411,643.
Office Action issued in corresponding Chinese Patent Application No. 201910410807.5, dated Feb. 25, 2022.

* cited by examiner

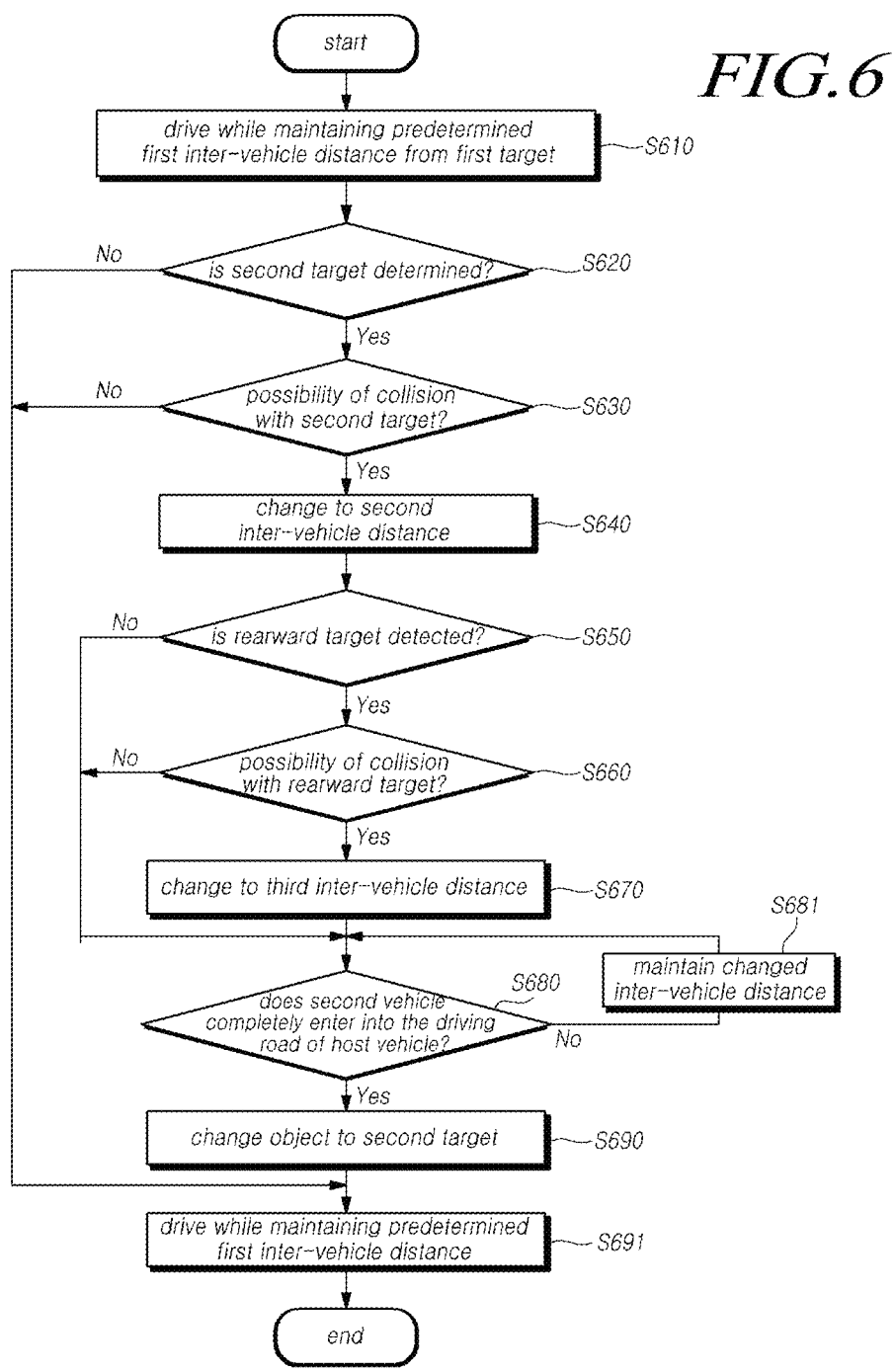

APPARATUS AND A METHOD FOR CONTROLLING AN INTER-VEHICLE DISTANCE

CROSS REFERENCE TO RELATED APPLICATION

This application is a continuation of U.S. patent application Ser. No. 16/411,643 filed May 14, 2019 which claims priority from Korean Patent Application No. 10-2018-0056451, filed on May 17, 2018, both applications are hereby incorporated by reference for all purposes as if fully set forth herein.

BACKGROUND OF THE INVENTION

1. Field of the Invention

The present disclosure relates to an apparatus and a method for controlling an inter-vehicle distance.

2. Description of the Prior Art

Recently, consumers are interested in the performance and convenience of vehicles. As demands for the performance of vehicles and the safety and convenience of drivers have increased, study and development have been continuously conducted in connection with an Advanced Driver Assist System (ADAS), which controls a vehicle and assists a driver when driving the vehicle.

A smart cruise control (SCC) system, which is one such ADAS, is being popularized.

The SCC system is a system that controls driving of the vehicle so as to maintain a predetermined inter-vehicle distance from a preceding vehicle. That is, the SCC system detects a preceding vehicle so that the vehicle maintains a predetermined inter-vehicle distance from the preceding vehicle that drives on the road on which the vehicle drives, and may control the speed, steering, or the like of the vehicle based on the result of sensing, without manipulation by a driver.

In this instance, another vehicle that drives on a road adjacent to the road on which the vehicle drives may cut into the driving road on which the vehicle drives. In this instance, since the vehicle's driving is controlled based on the preceding vehicle, a collision may occur between the vehicle and the vehicle that cuts in.

Also, at the point in time at which another vehicle cuts into the road on which the vehicle drives, control for rapidly decreasing the speed of the vehicle may be performed on the vehicle in order to maintain a predetermined inter-vehicle distance from another vehicle. In this instance, the vehicle may collide with a rearward vehicle that drives behind the vehicle on the road on which the vehicle drives.

Therefore, the existing SCC system may not stably perform control associated with the longitudinal direction of the vehicle in the state in which another vehicle cuts in, which drives on a road adjacent to the road on which the vehicle currently drives.

SUMMARY OF THE INVENTION

In this background, an aspect of the present disclosure is to provide an apparatus and a method for controlling an inter-vehicle distance, which may more stably perform a control associated with the longitudinal direction of a vehicle, while the vehicle drives.

Also, the present disclosure is to provide an apparatus and a method for controlling an inter-vehicle distance, which may preemptively prevent a collision that may occur while a vehicle drives on a road.

Also, the present disclosure is to provide an apparatus and a method for controlling an inter-vehicle distance, which may prevent a malfunction of an autonomous vehicle to which a smart cruise control system is applied.

Also, the present disclosure is to prevent rapid acceleration or deceleration of a vehicle, which may be attributable to a vehicle that is cutting in, whereby a driver may be provided with a better riding comfort.

In accordance with an aspect of the present disclosure, there is provided an apparatus for controlling an inter-vehicle distance. The apparatus for controlling an inter-vehicle distance may include: at least one of a first sensor or a second sensor mounted to a host vehicle to have a field of view with respect to an exterior of the host vehicle; and a controller communicatively connected to the at least one of the first sensor or the second sensor and configured to: recognize one or more forward targets in front of the host vehicle, based on at least one of an image data processed by the first sensor or a sensing data processed by the second sensor; control the host vehicle to drive while maintaining a predetermined first inter-vehicle distance from a first target that precedes on a driving road of the host vehicle from among the one or more forward targets; determine whether a second target from among the one or more forward targets cuts into the driving road of the host vehicle; if the second target cuts into the driving road of the host vehicle, determine a possibility of collision with the second target; if the host vehicle has the possibility of collision with the second target, maintain the first target as an object from which the host vehicle is to maintain an inter-vehicle distance, and control the host vehicle to drive while maintaining a second inter-vehicle distance, which is farther than the first inter-vehicle distance; determine whether the second target completely entered into the driving road of the host vehicle via lane change; and if the second target completely entered into the driving road of the host vehicle, change the object from which the host vehicle is to maintain the inter-vehicle distance from the first target to the second target, and control the host vehicle to drive while maintaining the predetermined first inter-vehicle distance from the second target.

In accordance with another aspect of the present disclosure, there is provided a method for controlling an inter-vehicle distance. The method for controlling an inter-vehicle distance may include: recognizing one or more forward targets in front of a host vehicle by capturing image data using a first sensor; controlling the host vehicle to drive while maintaining a predetermined first inter-vehicle distance from a first target that precedes on a driving road of the host vehicle from among the one or more forward targets; determining whether a second target from among the one or more forward targets cuts into the driving road of the host vehicle; when the second target cuts into the driving road of the host vehicle, determining a possibility of collision with the second target; when the host vehicle has the possibility of collision with the second target, maintaining the first target as an object from which the host vehicle is to maintain an inter-vehicle distance, and controlling the host vehicle to drive while maintaining a second inter-vehicle distance, which is farther than the first inter-vehicle distance; determining whether the second target completely entered into the driving road of the host vehicle via lane change; and when the second target completely entered into the driving road of the host vehicle, changing the object from which the host vehicle is to maintain the inter-vehicle distance from the first target to the second target, and controlling the host vehicle to drive while maintaining the predetermined first inter-vehicle distance from the second target.

As described above, according to the present disclosure, there may be provided an apparatus and a method for controlling an inter-vehicle distance, which may more stably perform control, associated with the longitudinal direction of a vehicle while the vehicle drives.

Also, according to the present disclosure, there may be provided an apparatus and a method for controlling an inter-vehicle distance, which may preemptively prevent a collision that may occur while a vehicle drives on a road.

Also, according to the present disclosure, there may be provided an apparatus and a method for controlling an inter-vehicle distance, which may prevent the malfunction of an autonomous vehicle to which a smart cruise control system is applied.

Also, according to the present disclosure, rapid acceleration or deceleration of the speed of a vehicle, which may be attributable to a vehicle cutting in, may be prevented, whereby a driver may be provided with better riding comfort.

BRIEF DESCRIPTION OF THE DRAWINGS

The above and other aspects, features and advantages of the present disclosure will be more apparent from the following detailed description taken in conjunction with the accompanying drawings, in which:

FIG. 6 is a flowchart illustrating a third operation method of the apparatus according to an embodiment;

DETAILED DESCRIPTION OF THE EXEMPLARY EMBODIMENTS

Hereinafter, embodiments of the present disclosure will be described in detail with reference to the accompanying drawings. In the description of the elements of the present disclosure, terms "first", "second", "A", "B", "(a)", "(b)" and the like may be used. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

A vehicle in the present specification may conceptually include a car, a motorcycle, and the like. Also, the vehicle may conceptually include all of an internal combustion engine vehicle equipped with an engine as a power source, a hybrid vehicle equipped with an engine and an electrical motor as a power source, and an electric vehicle equipped with an electric motor as a power source. Hereinafter, descriptions of a vehicle will be provided from the perspective of a car.

In the following descriptions, "forward" indicates the direction in which a vehicle drives, and "rearward" indicates the direction in which a vehicle reverses. Also, "the left of a vehicle" indicates the left when facing the direction in which the vehicle drives, and "the right of a vehicle" indicates the right when facing the direction in which the vehicle drives. Also, "the rear-lateral direction of a vehicle" indicates a direction to the left or the right of the direction in which the vehicle reverses.

In the present specification, lines on a road are marked at regular intervals in the direction in which the vehicle drives. That is, "line" indicates a lane mark that distinguishes roads.

In the present specifications, "road" and "lane" may have the same meaning. Accordingly, in the present specification, "road" and "roadway" may be interchangeably used, and should be construed as the same meaning.

In the present specification, the meaning of "sensing a road" indicates sensing a vehicle driving on a corresponding road or an obstacle or a pedestrian existing on the corresponding road.

In the present specification, "adjacent road" is illustrated as a single road which is adjacent to the right of a road on which the vehicle drives. However, the adjacent road is not limited thereto. The adjacent road may be a single road which is adjacent to the left of the vehicle, or maybe two or more adjacent roads which are adjacent to the left and right of the road on which the vehicle drives. Hereinafter, "adjacent road" indicates a road adjacent to the left of a road on which a vehicle drives, for ease of description.

Figure 1A:
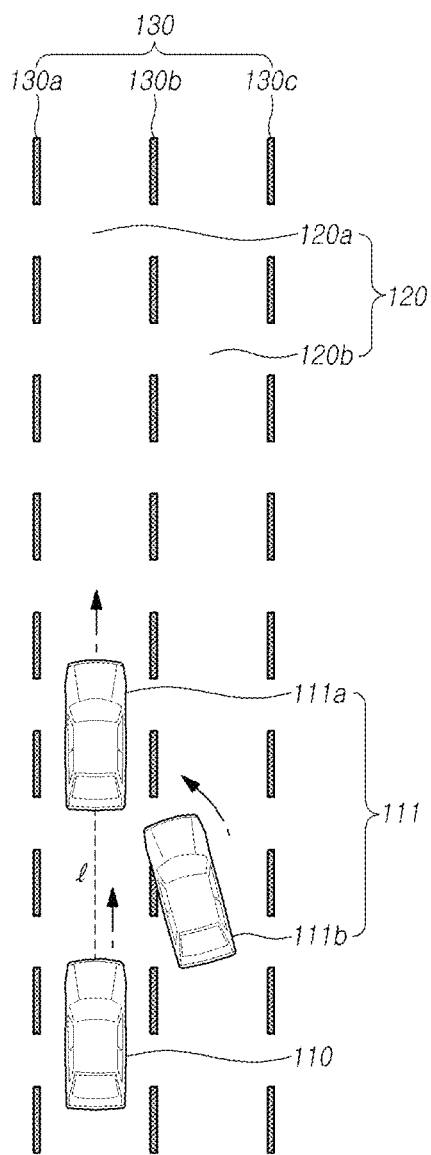
FIG. 1A and FIG. 1B are diagrams illustrating the situation in which a host vehicle equipped with a smart cruise control system drives on a road and a forward vehicle drives in front of the host vehicle.
Figure 1B:
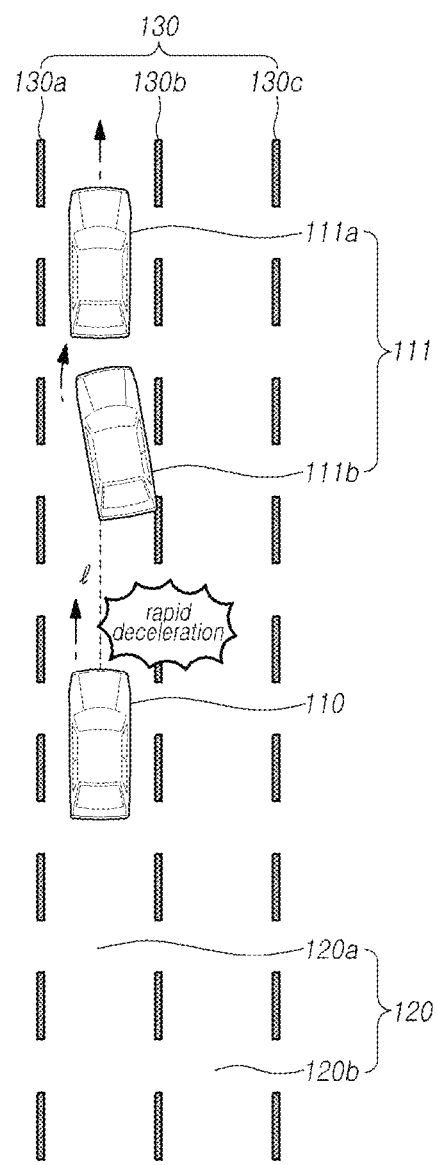

FIG. 1A and FIG. 1B are diagrams illustrating the situation in which a host vehicle 110 equipped with a smart cruise control system drives on a road and a forward vehicle 111 drives in front of the host vehicle 110.

Referring to FIG. 1A, the host vehicle 110 equipped with a smart cruise control (SCC) system drives while maintaining an inter-vehicle distance of 1 from the first vehicle 111a which precedes on a driving road 120a of the host vehicle

110. The inter-vehicle distance of 1 may be a value predetermined by the SCC system, or may be a value set by a driver based on driving conditions.

In the situation in which the host vehicle 110 drives while maintaining the inter-vehicle distance of 1 from the first vehicle 111*a*, an second vehicle 111*b* which drives on an adjacent road 120*b* of the driving road 120*a* of the host vehicle 110 may cut into the driving road 120*a* of the host vehicle 110.

In this instance, if the inter-vehicle distance of 1 is insufficiently long, a collision between the host vehicle 110 and the second vehicle 111*b* may occur. Also, even if a collision due to the cut-in by the second vehicle 111*b* does not occur, longitudinal control of the host vehicle 110 may not be stably performed due to the second vehicle 111*b*.

Referring to FIG. 1B, if the host vehicle 110 detects the second vehicle 111*b* on the driving road 120*a* of the host vehicle 110, the host vehicle 110 may perform control such that the host vehicle 110 drives while maintaining an inter-vehicle distance of 1 from the second vehicle 111*b*.

In this instance, since a longitudinal inter-vehicle distance between the second vehicle 111*b* and the host vehicle 110 is short, the host vehicle 110 may decelerate rapidly in order to maintain the inter-vehicle distance of 1 from the second vehicle 111*b*. Therefore, the driver of the host vehicle 110 may experience driving discomfort, or may feel an impact inside the host vehicle 110. Also, if another vehicle (not illustrated) is present behind the host vehicle 110, the host vehicle 110 may collide with the rearward vehicle, which is a drawback.

In order to overcome this drawback, the present disclosure aims to provide an apparatus and a method for controlling an inter-vehicle distance using the same. The apparatus may stably control the driving of the host vehicle 110 in the situation in which the second vehicle 111*b* cuts into the driving road 120*a* of the host vehicle 110 while the smart cruise control system controls driving of the host vehicle 110.

In the embodiments of the present disclosure, the "target" may include all modes of transportation, such as a vehicle, a motorcycle, and the like. However, the present disclosure is not limited thereto. Hereinafter, for ease of description, the term "target" indicates a vehicle. That is, a forward target indicates the forward vehicle 111, a first target indicates the first vehicle 111*a*, and a second target indicates the second vehicle 111*b*.

Figure 2A:
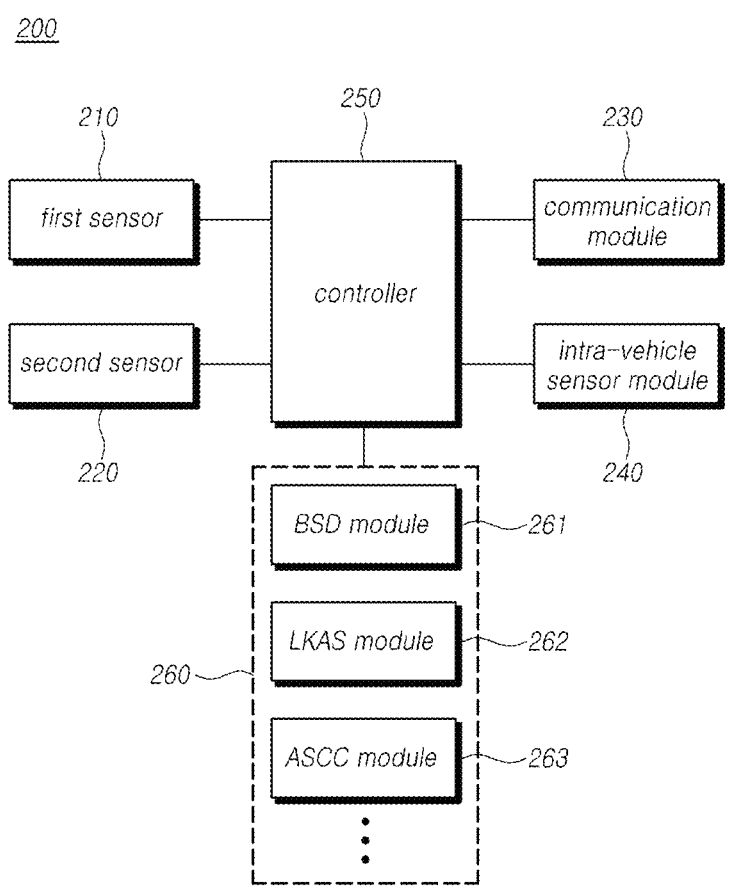
FIG. 2A is a diagram schematically illustrating the configuration of an apparatus for controlling an inter-vehicle distance according to an embodiment.

FIG. 2A is a diagram schematically illustrating the configuration of an apparatus 200 for controlling an inter-vehicle distance according to an embodiment.

Referring to FIG. 2A, the apparatus 200 according to an embodiment may include a first sensor 210, a second sensor 220, a communication module 230, an intra-vehicle sensor module 240, a controller 250, a driver assist system module 260 and the like.

The first sensor 210 may include an image sensor, configured to have a field of view with respect to an exterior of the host vehicle 110 and to capture image data, and a processor configured to process captured image data. The at least one first sensor 210 may be mounted to the host vehicle 110.

The image sensor may be mounted to the host vehicle 110 so as to have a field of view with respect to the inside or the outside of the host vehicle 110. At least one image sensor may be installed at each part of the host vehicle 110 so as to have a field of view ahead of the host vehicle 110, a field of view corresponding to lateral directions of the host vehicle 110, or a field of view behind the host vehicle 110.

The image sensor may include, for example, camera, LiDAR sensor.

Image information obtained via photographing by an image sensor is configured as image data, and thus, the image information may refer to image data captured by the image sensor. Hereinafter, in the present embodiment, image information obtained via photographing by the image sensor may indicate image data captured by the image sensor. The image data captured by the image sensor may be generated in one of the formats, for example, Raw AVI, MPEG-4, H.264, DivX, and JPEG.

The image sensor may capture image data including all the driving road 120*a* of the host vehicle 110 and the adjacent road 120*b*, from the area in front of the host vehicle 110, and two or more image sensors may respectively capture image data, which respectively include sections into which the area in front of the host vehicle 110 is regularly divided.

For example, two image sensors, one of which is installed around the left headlight of the host vehicle 110 and the other of which is installed around the right headlight, may detect the adjacent road 120*b*, and an image sensor installed at the grille of the host vehicle 110 may detect the driving road 120*a* of the host vehicle 110. However, the present disclosure is not limited thereto.

An image sensor may be installed in the direction opposite the position of an image sensor which is installed at the front side of the host vehicle 110 so as to capture image data including information associated with an object existing behind the host vehicle 110. For example, the image sensor may be installed around the taillight of the host vehicle 110, or may be installed around the license plate. However, the present disclosure is not limited thereto.

In the same manner as the image sensor, a single image sensor may detect an area behind the host vehicle 110, and two or more sensors may detect respective predetermined areas. Anything that may be used as an image sensor may be equivalent to an image sensor. However, the present disclosure is not limited thereto.

The image data captured by an image sensor may be processed by a processor. The processor may operate so as to process image data captured by the image sensor.

The processor may be implemented using at least one of the electrical units which are capable of processing image data and performing other functions, for example, application-specific integrated circuits (ASICs), digital signal processors (DSPs), digital signal processing device (DSPDs), programmable logic device (PLDs), field-programmable gate arrays (FPGAs), controllers, micro-controllers, microprocessors, and the like.

The second sensor 220 may indicate a sensor module, excluding the first sensor 210 that captures an image. For example, a plurality of the second sensors 220 may be mounted to a host vehicle 110 to have a sensing area with respect to an exterior of the host vehicle 110, and may capture sensing data. The plurality of the second sensors 220 may include, for example, a radar sensor, an ultrasonic sensor, and the like. The second sensor 220 may not be included, or one or more the second sensors 220 may be included.

The communication module 230 may function in order to perform communication between vehicles, communication between a host vehicle 110 and an infrastructure, communication between a host vehicle 110 and a server, intra-vehicle communication, and the like. To this end, the communication module 230 may include a transmission module and a reception module. For example, the communication module 230 may include a broadcast reception module, a wireless internet module, a short-range communication module, a position information module, a light communication module, a V2X communication module, and the like.

The broadcast reception module receives broadcast signals or broadcast-related information from an external broadcast management server via a broadcasting channel. Here, the broadcasting includes at least one of radio broadcasting and TV broadcasting. The wireless internet module refers to a module for accessing the internet in a wireless manner, and may be installed inside or outside the host vehicle 110. The short-range communication module is for short-range communication, and may support short-range communication using at least one of Bluetooth™, radio frequency identification (RFID), infrared data association (IrDA), ultra-wideband (UWB), ZigBee, near field communication (NFC), wireless-fidelity (Wi-Fi), Wi-Fi direct, and wireless universal serial bus (wireless USB).

The position information module is a module for obtaining position information of a host vehicle 110, and a representative example thereof is a global positioning system (GPS) module. For example, a host vehicle 110 may utilize a GPS module and may obtain the position of a host vehicle 110 based on a signal sent from a GPS satellite. According to an embodiment, the position information module may be an element that is included in the intra-vehicle sensor module 240, as opposed to an element included in the communication module 230.

The light communication module may include a light sender and a light receiver. The light sender and the light receiver may change a light signal into an electrical signal, and may transmit and receive information.

The V2X communication module is a module for performing wireless communication with a server, another vehicle, an infrastructure apparatus, and the like. In the present embodiment, the V2X communication module refers to an operation or a technology in which a host vehicle 110 exchanges information with a thing, such as another vehicle, a mobile apparatus, a road, or the like, via a wired or wireless network. The V2X communication module may conceptually include, for example, vehicle-to-vehicle communication, vehicle-to-infrastructure (V2I) communication, vehicle-to-nomadic apparatus (V2N) communication, vehicle-to-pedestrian (V2 P) communication, and the like. The V2X communication module is based on dedicated short-range communications (DSRC), and may use wireless access in vehicular environment (WAVE), which was introduced by IEEE in the U.S., or IEEE 802.11p communication technology which uses a 5.9 GHz band. However, the present disclosure is not limited thereto, and the V2X communication module should be conceptually understood to include all types of communication with a host vehicle 110 that currently exist or have yet to be developed.

The intra-vehicle sensor module 240 may refer to a sensor for sensing intra-vehicle information. For example, the intra-vehicle sensor module 240 may indicate a torque sensor for sensing a steering torque, a steering angle sensor for sensing a steering angle, a motor location sensor for sensing information associated with a steering motor, a vehicle speed sensor, a vehicle movement detection sensor for sensing the movement of a host vehicle 110, a vehicle posture detection sensor, and the like. In addition, the intra-vehicle sensor module 240 may indicate a sensor for sensing various data inside a host vehicle 110, and one or more intra-vehicle sensor modules 240 may be included.

The controller 250 may be connected to the first sensor 210, the second sensor 220, the communication module 230 and the intra-vehicle sensor module 240.

The controller 250 may obtain data from at least one module selected from among the first sensor 210, the second sensor 220, the communication module 230, and the intra-vehicle sensor module 240, and may control various operations of a host vehicle 110 based on the obtained data. Alternatively, the controller 250 may obtain image data from the first sensor 210, and may process the image data. Also, the controller 250 may receive sensing data from the second sensor 220, and may process the sensing data. Alternatively, the controller 250 may obtain data from the intra-vehicle sensor module 240 or the communication module 230, and may process the data. To this end, the controller 250 may include at least one processor.

The controller 250 may recognize one or more forward targets 111 in front of the host vehicle 110 from the result of processing image data, based on the image data processed by the first sensor 210, may select the first target 111a that precedes on the driving road 120a of the host vehicle 110 from among the one or more forward targets 111, and may control the host vehicle 110 to drive while maintaining a predetermined first inter-vehicle distance from the first target 111a.

Specifically, the controller 250 may recognize one or more forward targets in front of the host vehicle 110, based on processing of the image data.

And, the controller 250 may control the host vehicle 110 to drive while maintaining a predetermined first inter-vehicle distance from a first target 111a that precedes on a driving road of the host vehicle from among the one or more forward targets 111.

And, the controller 250 may determine whether a second target 111b from among the one or more forward targets 111 cuts into the driving road of the host vehicle.

And, if the second target 111b cuts into the driving road of the host vehicle, the controller 250 may determine a possibility of collision with the second target 111b.

And, if the host vehicle has the possibility of collision with the second target 111b, the controller 250 may maintain the first target 111a as an object from which the host vehicle is to maintain an inter-vehicle distance, and the controller 250 may control the host vehicle to drive while maintaining a second inter-vehicle distance, which is farther than the first inter-vehicle distance.

And, the controller 250 may determine whether the second target 111b completely entered into the driving road of the host vehicle via lane change.

And, if the second target 111b completely entered into the driving road of the host vehicle 110, the controller 250 may change an object from which the host vehicle 110 is to maintain the inter-vehicle distance from the first target 111a to the second target 111b, and the controller 250 may control the host vehicle to drive while maintaining the predetermined first inter-vehicle distance from the second target 111b.

The controller 250 may receive a signal corresponding to various kinds of driving information, may perform a predetermined algorithm and logic, and may output a control signal so as to control driving, steering, and stopping of a host vehicle 110. Here, the driving information may be information on the driving of the host vehicle 110, ambient vehicle information, ambient environment information, and the like. However, the present disclosure is not limited thereto.

If the first target 111a does not exist, the controller 250 may control the host vehicle 110 to drive at a predetermined speed. If the first target 111a is detected, the controller 250 may perform control such that the host vehicle 110 appropriately accelerates or decelerates in order to maintain a predetermined inter-vehicle distance from the first target 111a.

Here, the controller 250 may recognize a rearward target behind the host vehicle 110 from the result of processing the image data.

The controller 250 may be an electric control unit (ECU), a micro control unit (MCU), or the like.

The operation of the controller 250 will be described in detail with reference to FIG. 2B.

Meanwhile, the controller 250 may operate to control one or more from among various driver aid systems used for the host vehicle 110. For example, the controller 250 may determine a predetermined situation, a predetermined condition, occurrence of a predetermined event a control operation to be performed, and the like, based on data obtained from at least one of the above-described modules 210, 220, 230, and 240.

The controller 250 may transmit a signal for controlling the operation of various driver assist system modules 260 configured inside the host vehicle 110 using the determined information or the like. For example, the driver assist system module 260 may include a blind spot detection (BSD) system module, a lane-keeping assist system (LKAS) module, an adaptive smart cruise control (ASCC) system module (also referred to as a smart cruise control (SCC) or adaptive cruise control (ACC) system module), a smart parking assist system (SPAS) module, and the like. In addition, various driver assist system modules 260 may be configured with the host vehicle 110, such as a lane departure warning system (LDWS), a lane change assist system (LCAS), a smart parking assist system (SPAS), and the like.

The terms and names given to the driver assist system described herein are merely examples, and the present disclosure is not limited thereto. Also, the driver assist system module 260 may include an autonomous driving module for autonomous driving. Alternatively, the controller 250 may control the host vehicle 110 to perform autonomous driving by controlling individual system modules included in the driver assist system module 260.

The apparatus 200 according to the present embodiment may be configured by combining the above-described elements as necessary. For example, the apparatus 200 may include the first sensor 210, the second sensor 220, and the controller 250. As another example, the apparatus 200 may include the first sensor 210 and the controller 250. As another example, the apparatus 200 may include the second sensor 220 and the controller 250. However, the present disclosure is not limited thereto.

Figure 2B:
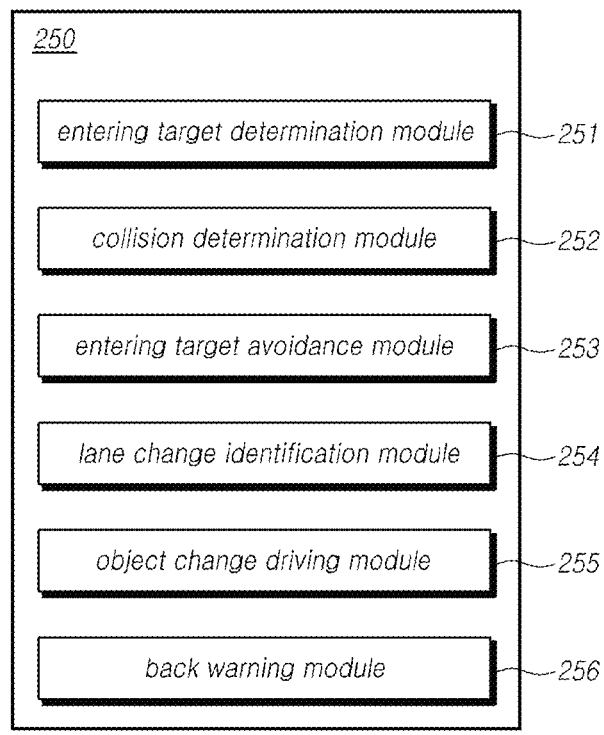
FIG. 2B is a diagram schematically illustrating the configuration of a controller included in the apparatus for controlling an inter-vehicle distance according to an embodiment.

FIG. 2B is a diagram schematically illustrating the configuration of the controller 250 included in the apparatus 200 for controlling an inter-vehicle distance according to an embodiment.

Referring to FIG. 2B, the controller 250 may include: an entering target determination module 251 configured to determine, as the second target 111b, a target that cuts into the driving road 120a of the host vehicle 110 from among one or more forward targets 111, a collision determination module 252 configured to determine the possibility of collision with the second target 111b, an entering target avoidance module 253 configured to maintain the first target 111a as an object from which the host vehicle 110 is to maintain the inter-vehicle distance, to change the first inter-vehicle distance to a second inter-vehicle distance, which is farther than the first inter-vehicle distance, and to control the host vehicle 110 to drive while maintaining the second inter-vehicle distance from the first target 111a, if the host vehicle 110 has the possibility of collision with the second target 111b, a lane change identification module 254 configured to determine whether the second target 111b completely entered into the driving road 120a of the host vehicle 110 via lane change, and an object change driving module 255 configured to change an object, from which the host vehicle 110 is to maintain the inter-vehicle distance, from the first target 111a to the second target 111b, so as to control the host vehicle 110 to drive while maintaining the predetermined first inter-vehicle distance from the second target 111b, if the second target 111b has completely entered into the driving road of the host vehicle 110.

The entering target determination module 251 may identify whether a target among the forward targets 111, obtained based on the result of processing at least one of image data and sensing data, cuts into the driving 120a of the host vehicle 110, and may determine the identified target as the second target 111b.

Whether a target cuts into the driving road 120a of the host vehicle 110 may be determined based on various methods.

For example, whether a target cuts in may be determined based on whether a blinker in the taillight of the forward target 111 is turned on. Particularly, if a blinker of a target, which drives on the road 120b adjacent to the driving road 120a of the host vehicle 110 and is selected from among one or more forward targets 111, is turned on, the entering target determination module 251 may determine the target of which the blinker is turned on as a second target 111b.

As another example, the entry determination module 251 may set a predetermined area on the driving road 120a of the host vehicle 110, in which nothing is detected in front of the host vehicle 110, and may determine whether the forward target 111 occupies at least a predetermined range of the predetermined area, thereby determining whether the target is a second target 111b.

As another example, if the heading angle of a target is greater than or equal to a predetermined reference angle, wherein the target drives on the road 120b adjacent to the driving road 120a of the host vehicle 110 from among one or more forward targets 111, the entering target determination module 251 may determine the target of which heading angle is greater than or equal to the predetermined reference angle as a second target 111b.

As another example, the entering target determination module 251 may calculate the transverse speed and the transverse travel distance of the forward target 111, and may determine whether the target is a second target 111b by determining whether the transverse speed and the transverse travel distance correspond to predetermined conditions. Particularly, the entering target determination module 251 may calculate the transverse speed and the transverse travel distance of a target, the target driving on the road 120b adjacent to the driving road 120a of the host vehicle 110, from among one or more forward targets 111. The entering target determination module 251 may determine a target of which the calculated transverse speed and the transverse travel distance satisfy a predetermined cut-in condition as an entering target.

As another example, if one or more front wheels of a target cross a line 130b in the direction from the adjacent road 120b to the driving road 120a of the host vehicle 110, wherein the target drives on the road 120b adjacent to the driving road 120a of the host vehicle 110 from among one or more forward targets 111, the entering target determination module 251 may determine the target as the second target 111b. Here, although the descriptions provide an example in which the front wheels of the second target 111b cross the line 130b existing between the driving road 120a of the host vehicle 110 and the adjacent road 120b, the present disclosure is not limited thereto.

The collision determination module 252 determines whether the host vehicle 110 has the possibility of collision with the second target 111b. Here, if the controller 250 recognizes a rearward target behind the host vehicle 110 from the result of processing at least one of image data and sensing data, the collision determination module 252 may determine the possibility of collision with the rearward target.

There are various methods of determining the possibility of collision. For example, if a calculated time-to-collision (TTC) with the second target 111b corresponds to a predetermined condition, it is determined that the host vehicle 110 has the possibility of collision. However, the present disclosure is not limited thereto.

The entering target avoidance module 253 may control the speed or steering of the host vehicle 110 in order to avoid a collision with the second target 111b. In this instance, the entering target avoidance module 253 may continuously maintain the first target 111a as an object from which the host vehicle 110 is to maintain an inter-vehicle distance, and may control the host vehicle 110 to be more distant than a predetermined inter-vehicle distance.

That is, while the second target 111b cuts into the driving road 120a of the host vehicle 110, the entering target avoidance module 253 applies the smart cruise control (SCC) system for the first target 111a, changes the inter-vehicle distance to a second inter-vehicle distance, which is greater than the first inter-vehicle distance, and decreases the speed of the host vehicle 110 so as to satisfy the changed second inter-vehicle distance, without manipulation by a driver.

Here, there are various methods of calculating the second inter-vehicle distance, such as a method of calculating an avoidance distance based on a driving condition, a method of using an avoidance distance that is previously determined in the design, and the like.

For example, the entering target avoidance module 253 may measure the overall length of the second target 111b, and may change the first inter-vehicle distance to the second inter-vehicle distance by taking into consideration the measured overall length. That is, the second inter-vehicle distance may be determined by adding the measured overall length to the first inter-vehicle distance.

Here, the overall length of a vehicle indicates the maximum longitudinal length of the vehicle. The method of measuring the overall length of the second target 111b may be performed using the second sensor 220, for example, a radar sensor, or the like, which is installed at the front side of the host vehicle 110.

For example, the radar sensor transmits a transmission signal to the second target 111b, and the entering target avoidance module 253 receives a reception signal reflected from the second target 111b and measures the maximum longitudinal length of the second target 111b. However, the present disclosure is not limited thereto.

As another example, the second inter-vehicle distance may be an inter-vehicle distance that is previously determined to be an integer multiple (two times, three times, or the like) of the first inter-vehicle distance.

Therefore, the entering target avoidance module 253 may control the longitudinal driving of the host vehicle 110 in order to avoid a collision with the second target 111b.

In this instance, if the first inter-vehicle distance is changed to the second inter-vehicle distance and a rearward vehicle that drives behind the host vehicle 110 exists, a collision with the rearward vehicle may occur.

Here, if the collision determination module 253 determines the possibility of collision with a rearward target, the entering target avoidance module 253 may correct the second inter-vehicle distance based on the possibility of collision with the rearward target, and may control the host vehicle 110 to drive while maintaining a third inter-vehicle distance from the first target 111a.

Here, the third inter-vehicle distance may be an inter-vehicle distance that is greater than the first inter-vehicle distance and less than the second inter-vehicle distance.

The lane change identification module 254 may determine whether the second target 111b enters into the driving road 120a of the host vehicle 110.

There are various methods of determining whether the second target 111b enters into the driving road 120a of the host vehicle 110.

For example, the lane change identification module 254 may determine whether all of the front wheels and the rear wheels of the second target 111b cross the line 130b from the road 120b, which is adjacent to the driving road 120a of the host vehicle 110, to the driving road 120a of the host vehicle 110.

As another example, if all of the front wheels and at least one rear wheel of the second target 111b completely cross the line 130b from the adjacent road 120b to the driving road 120a of the host vehicle 110, the lane change identification module 254 may determine that the second target 111b has completely entered into the driving road of the host vehicle 110.

As another example, if at least a predetermined part of the second target 111b (preferably, a half of the target) crosses the line 130b in the direction to the driving road 120a of the host vehicle 110, the lane change identification module 254 determines that the second target 111b has completely entered into the driving road of the host vehicle 110.

As another example, the lane change identification module 254 may set a predetermined intra-road area (not illustrated) on the driving road 120a of the host vehicle 110. The lane change identification module 254 identifies that the second target 111b performs steering in a first direction (turns to the left in FIGS. 1A and 1B) and enters the set area, and if at least a predetermined part of the second target 111b (preferably, half of the target) enters the set area and the second target 111b performs steering in a second direction (turns to the right in FIG. 1), the lane change identification module 254 may determine that the second target 111b has completely entered into the driving road of the host vehicle 110.

If the second target 111b enters into the driving road 120a of the host vehicle 110, the object change driving module 255 may change the object to which the smart cruise control (SCC) system is to be applied from the first target 111a to the second target 111b. If the object to which the smart cruise control (SCC) system is to be applied is changed to the second target 111b, the object change driving module 255 may control the host vehicle 110 to drive while maintaining the predetermined first inter-vehicle distance from the second target 111b. Here, the first inter-vehicle distance is shorter than the second inter-vehicle distance, and thus, the control by the object change driving module 255 may be control to accelerate the host vehicle 110.

Therefore, the object change driving module 255 may control the host vehicle 110 to stably drive even after the host vehicle 110 avoids a collision with the second vehicle 111b.

The driver of the rearward vehicle, which drives behind the host vehicle 110, may not recognize that the host vehicle 110 is controlled to decelerate.

Here, in order to report the driving condition of the host vehicle 110 to the driver of the rearward vehicle, the controller 250 may further include a back warning module 256 that performs back warning while the first inter-vehicle distance is changed to the second inter-vehicle distance.

The back warning module 256 may perform an operation of providing the back warning to another target existing behind the host vehicle 110. There are various methods in which the host vehicle 110 provides a warning to another target via the back warning module 256, for example, a warning sound, an emergency light, or the like. However, the present disclosure is not limited with regard thereto.

Here, even if another target does not exist behind the host vehicle 110, the back warning module 256 may operate while the first inter-vehicle distance is changed to the second inter-vehicle distance. Also, irrespective of whether the host vehicle 110 has the possibility of collision with another target existing behind the host vehicle 110, the back warning module 256 may operate while the first inter-vehicle distance is changed to the second inter-vehicle distance. However, the present disclosure is not limited thereto.

The operation method of each of the elements included in the controller 250 will be described in detail with reference to FIGS. 4 to 7.

In addition, the controller 250 may control the operation of at least one module from among the first sensor 210, the second sensor 220, the communication module 230, and the intra-vehicle sensor module 240. Also, the controller 250 may control the operation of various driver assist systems configured with a host vehicle 110.

Figure 3:
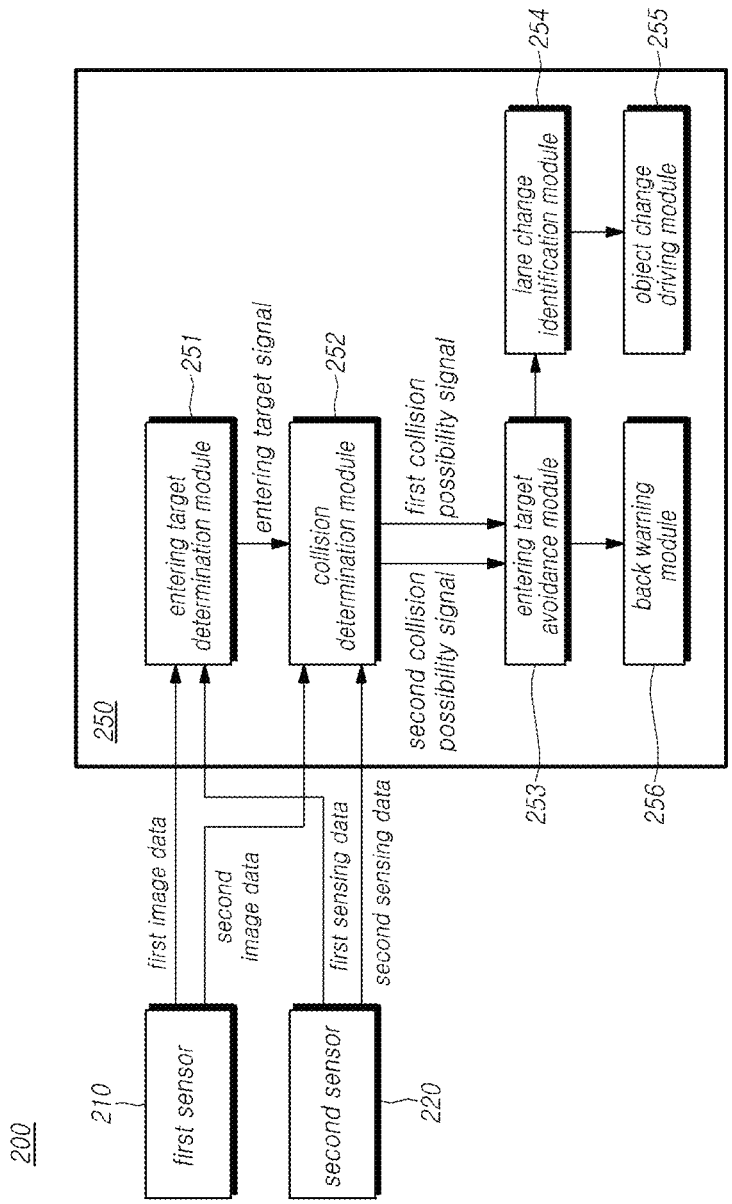
FIG. 3 is a block diagram illustrating an example of signal flow among elements of the apparatus for controlling an inter-vehicle distance according to an embodiment.

FIG. 3 is a block diagram illustrating an example of a signal flow among the elements of the apparatus 200 for controlling an inter-vehicle distance according to an embodiment.

Referring to FIG. 3, one or more the first sensors 210 and one or more the second sensors 220 may detect the forward target 111 in front of the host vehicle 110, and may detect a rearward target behind the host vehicle 110.

The first sensor 210 may output first image data including information associated with the forward target 111 to the entering target determination module 251, and the second sensor 220 may output first sensing data including information associated with the forward target 111 to the entering target determination module 251.

Also, the first sensor 210 may output second image data including information associated with a rearward target to the collision determination module 252, and the second sensor 220 may output second sensing data including information associated with a rearward target to the collision determination module 252.

The entering target determination module 251 may analyze a result of processing at least one of the first image data and the first sensing data, and may select, as the second target 111b, a target corresponding to the above described condition from among the detected forward targets 111. The entering target determination module 251 may output an entering target signal including information associated with the second target 111b to the collision determination module 252.

The collision determination module 252 may analyze a signal received from the entering target determination module 251, and may determine the possibility of collision with the second target 111b. Also, the collision determination module 252 may determine the possibility of collision with a rearward target, which is obtained from a result of processing at least one of the second image data and the second sensing data.

The collision determination module 252 may output, to the entering target avoidance module 253, a first collision possibility signal including a result of determining the possibility of collision with the second target 111b and a second collision possibility signal including a result of determining the possibility of collision with the rearward target.

The entering target avoidance module 253 may maintain the first target 111a as an object from which the host vehicle 110 is to maintain the inter-vehicle distance, may change the first inter-vehicle distance to the second inter-vehicle distance, and may control the host vehicle 110 to decelerate so that the host vehicle 110 can drive while maintaining the second inter-vehicle distance from the first target 111a. Operation signals may be output such that the back warning module 256 and the lane change identification module 254 operate.

If the lane change identification module 254 identifies that the second target 111b cuts in, the lane change identification module 254 may output an operation signal such that the object change driving module 255 operates.

The object change driving module 255 may control the host vehicle 110 to accelerate such that the host vehicle 110 drives while maintaining the first inter-vehicle distance from the second target 111b.

The back warning module 256 may control the host vehicle 110 to output a warning sound in order to report the driving state of the host vehicle 110 to a rearward vehicle driving behind the host vehicle 110.

Figure 4:
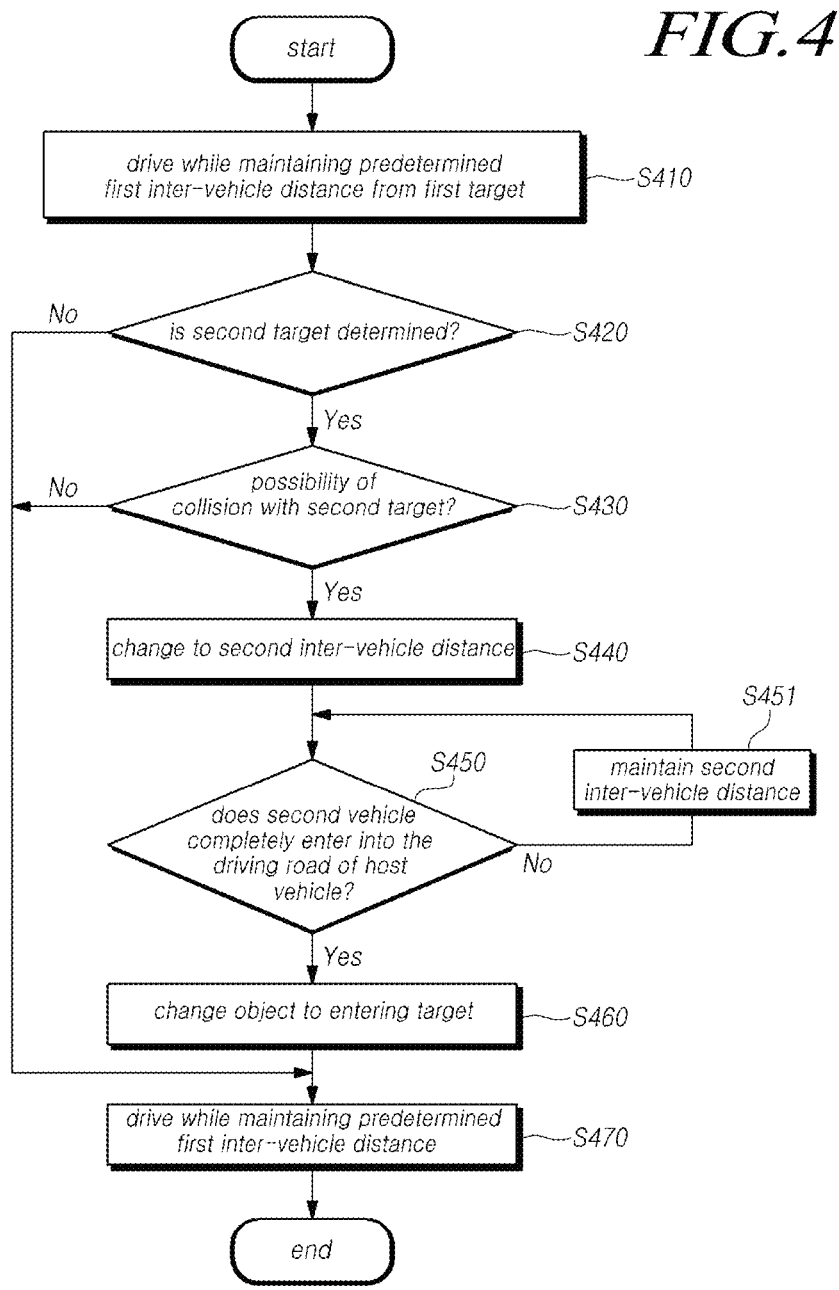
FIG. 4 is a flowchart illustrating a first operation method of the apparatus according to an embodiment.
Figure 5:
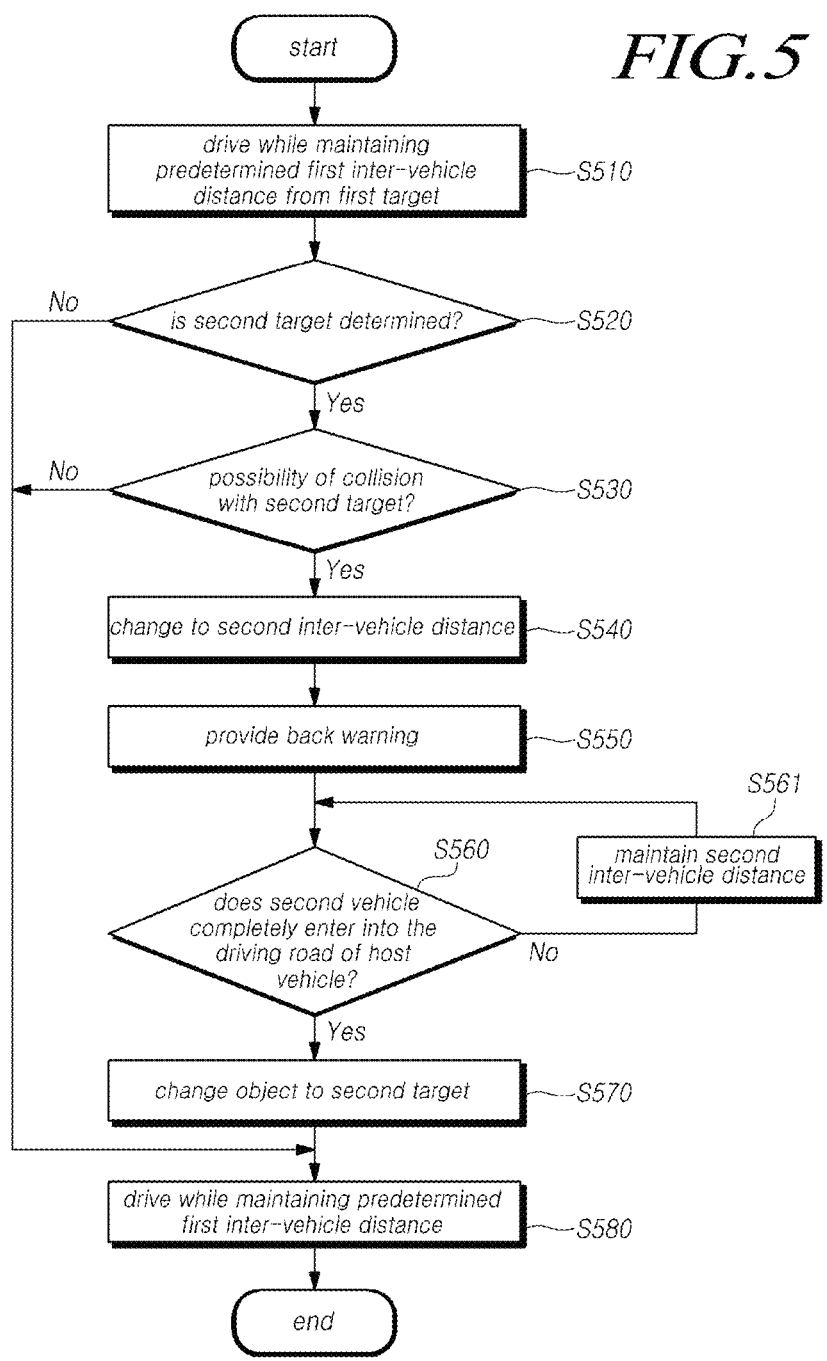
FIG. 5 is a flowchart illustrating a second operation method of the apparatus according to an embodiment.

FIG. 4 is a flowchart illustrating a first operation method of the apparatus 200 according to an embodiment. FIG. 5 is a flowchart illustrating a second operation method of the apparatus 200 according to an embodiment. FIG. 6 is a flowchart illustrating a third operation method of the apparatus 200 according to an embodiment.

Referring to FIG. 4, the inter-vehicle distance control apparatus 200 may control the host vehicle 110 to drive while maintaining a predetermined first inter-vehicle distance from the first target 111a in operation S410.

The apparatus 200 recognize a target that cuts in front of the host vehicle 110 from among forward targets 111 and determines the target as the second target 111b in operation S420.

If a second target 111b is present, the apparatus 200 determines whether the host vehicle 110 has the possibility of collision with the second target 111b in operation S430.

If the host vehicle 110 has the possibility of collision, the apparatus 200 maintains the first target 111a as an object from which the host vehicle 110 is to maintain an inter-vehicle distance, and the apparatus 200 changes the first inter-vehicle distance to a second inter-vehicle distance in operation S440. The apparatus 200 may control the host vehicle 110 to decelerate such that the inter-vehicle distance increases to the second inter-vehicle distance.

If the first inter-vehicle distance is changed to the second inter-vehicle distance, the apparatus 200 may determine whether the second target 111b has completely entered into the driving road of the host vehicle 110 in operation S450. The apparatus 200 may control the host vehicle 110 to continuously maintain the second inter-vehicle distance from the first target 111a until the second target 111b has completely entered into the driving road of the host vehicle 110 in operation S451.

If the second target 111b has completely entered into the driving road of the host vehicle 110, the apparatus 200 changes the object from which the host vehicle 110 is to maintain the inter-vehicle distance from the first target 111a to the second target 111b in operation S460.

If the object is changed to the second target 111b, the apparatus 200 may control the host vehicle 110 to accelerate such that the predetermined first inter-vehicle distance is maintained, and if the inter-vehicle distance corresponds to the first inter-vehicle distance, the apparatus 200 may control the speed of the host vehicle 110 to maintain the first inter-vehicle distance in operation S470.

If no second target 111b is recognized, or if there is no possibility of collision with the second target 111b, the apparatus 200 may control the host vehicle 110 to continuously maintain the first inter-vehicle distance from the first vehicle 111a in operation S470.

Referring to FIG. 5, the second operation method may further perform a process (operation S550) that provides a back warning, in addition to the first operation method.

Specifically, the warning control process (operation S550) may control the apparatus 200 to provide a warning sound behind the host vehicle 110 or to turn on an emergency light while a process (operation S540) of changing the inter-vehicle distance to the second inter-vehicle distance is being performed.

In the same manner, the third operation method of FIG. 6 may perform a rearward vehicle detection process (operation S650), a rearward vehicle collision possibility determination process (operation S660), and a third inter-vehicle distance changing process (operation S670), in addition to the first operation method and the second operation method, and the processes will be described below.

Referring to FIG. 6, while the host vehicle 110 decelerates to realize the second inter-vehicle distance in operation S640, the apparatus 200 determines whether a rearward vehicle is detected behind the host vehicle 110 in operation S650.

If a rearward vehicle is detected, the apparatus 200 determines the possibility of collision with the rearward vehicle in operation S660.

If there is the possibility of collision with the rearward vehicle, the apparatus 200 may change the inter-vehicle distance to a third inter-vehicle distance, which is greater than the first inter-vehicle distance but less than the second inter-vehicle distance, in operation S670.

Here, the third inter-vehicle distance may be determined by taking into consideration a time-to-collision (TTC) with the rearward vehicle.

Hereinafter, the operation of the apparatus 200 according to the present disclosure will be described in detail by describing the situation in which vehicles drive. In this instance, for ease of description, descriptions will be provided using vehicles which may belong to targets.

Figure 7A:
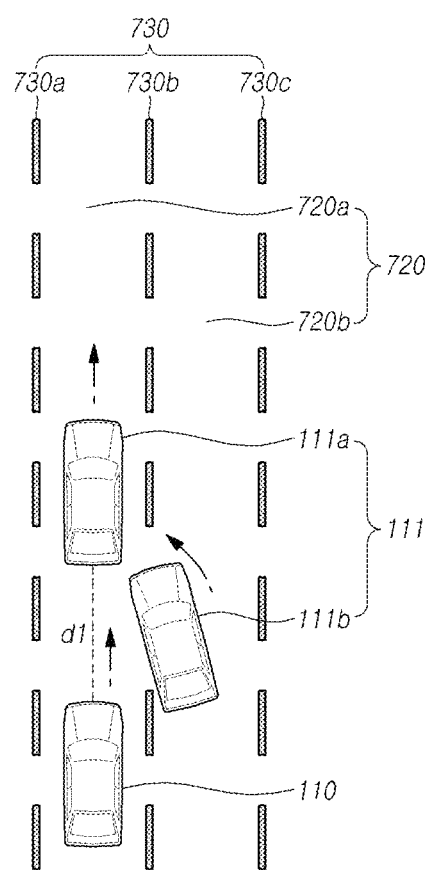
FIGS. 7A to 7C are diagrams illustrating the situation in which the host vehicle equipped with an apparatus for controlling an inter-vehicle distance according to an embodiment drives on a road and a forward vehicle drives in front of the host vehicle.
Figure 7B:
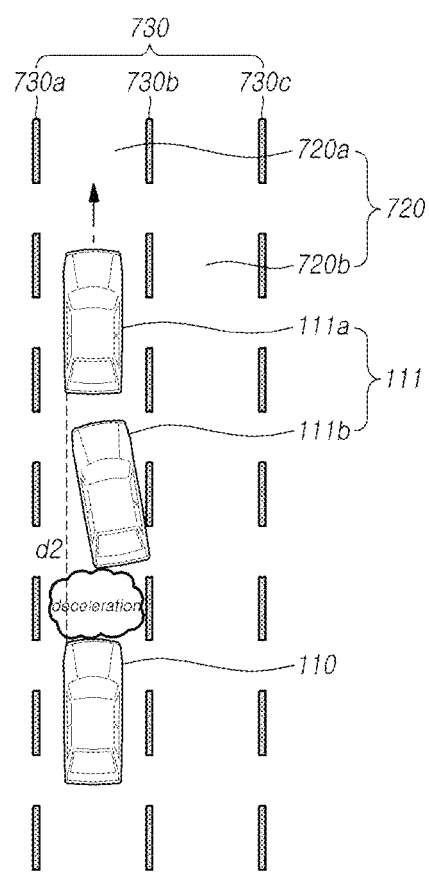
Figure 7C:
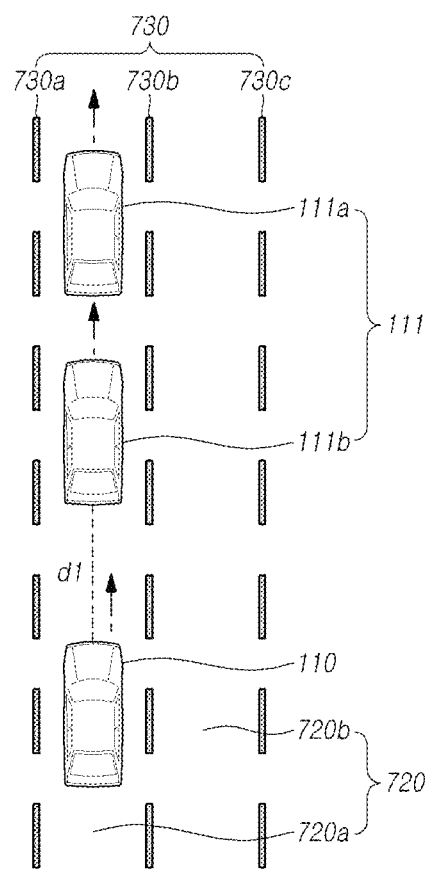

FIGS. 7A to 7C are diagrams illustrating the situation in which the host vehicle 110 equipped with the apparatus 200 according to an embodiment drives on a road and the forward vehicle 111 drives in front of the host vehicle 110.

Referring to FIG. 7A, a first inter-vehicle distance may be set to d1 in advance by a driver or an SCC system, and the host vehicle 110 drives while maintaining the first inter-vehicle distance of d1 from the first vehicle 111a.

The second vehicle 111b, which drives on an adjacent road 720b, which is adjacent to a driving road 720a of the host vehicle 110, attempts to cut in front of the host vehicle 110.

The apparatus 200 installed in the host vehicle 110 may detect the second vehicle 111b, and may determine whether the second vehicle 111b corresponds to a condition of determining an entering vehicle.

Referring to FIG. 7B, the apparatus 200 installed in the host vehicle 110 may determine the possibility of collision with the second vehicle 111b.

If it is determined that there is the possibility of collision, the apparatus 200 installed in the host vehicle 110 changes the first inter-vehicle distance of d1, which is far from the first vehicle 111a, to a second inter-vehicle distance of d2, and may control the host vehicle 110 to decelerate during a predetermined period of time such that the inter-vehicle distance reaches the second inter-vehicle distance of d2.

If the inter-vehicle distance between the first vehicle 111a and the host vehicle 110 corresponds to the second inter-vehicle distance of d2, the apparatus 200 installed in the host vehicle 110 may control the host vehicle 110 to drive while maintaining the second inter-vehicle distance of d2 from the first vehicle 111a until the second vehicle 111b completely cuts in.

Referring to FIG. 7C, if the second vehicle 111b completely cuts into the driving road 720a of the host vehicle 110, the apparatus 200 installed in the host vehicle 110 may change the object from which the host vehicle 110 is to maintain the inter-vehicle distance to the second vehicle 111b.

The apparatus 200 installed in the host vehicle 110 may control the host vehicle 110 to accelerate during a predetermined period of time such that the host vehicle 110 can drive by decreasing the inter-vehicle distance to the second vehicle 111b to the first inter-vehicle distance of d1 set by a driver.

If the inter-vehicle distance to the second vehicle 111b corresponds to the first inter-vehicle distance of d1, the apparatus 200 installed in the host vehicle 110 may control the speed of the host vehicle 110 in order to maintain the first inter-vehicle distance of d1.

Figure 8A:
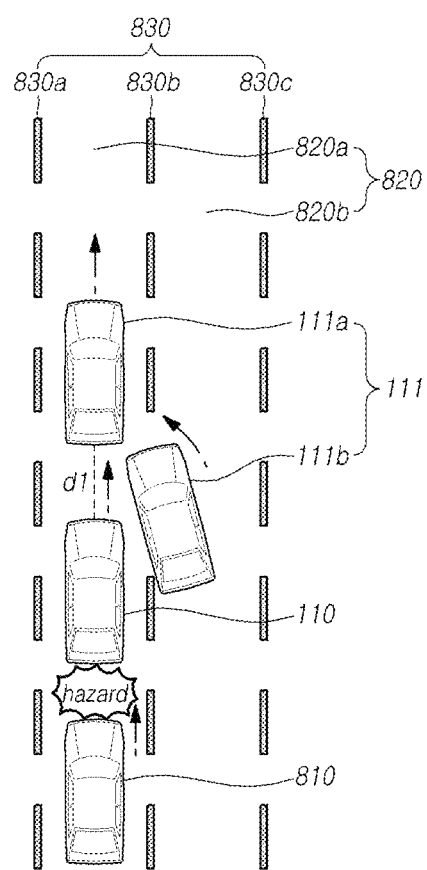
FIGS. 8A to 8C are diagrams illustrating the situation in which the host vehicle equipped with an apparatus for controlling an inter-vehicle distance according to an embodiment drives on a road and a forward vehicle and a rearward vehicle respectively drive in front of and behind the host vehicle.
Figure 8B:
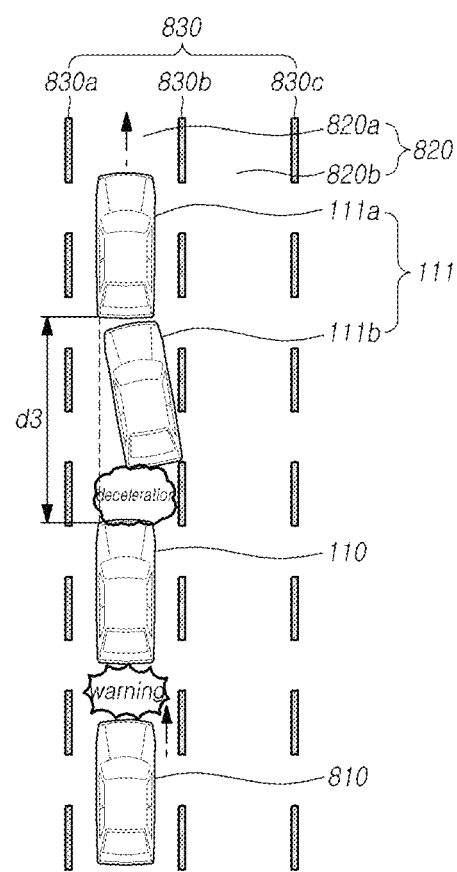
Figure 8C:
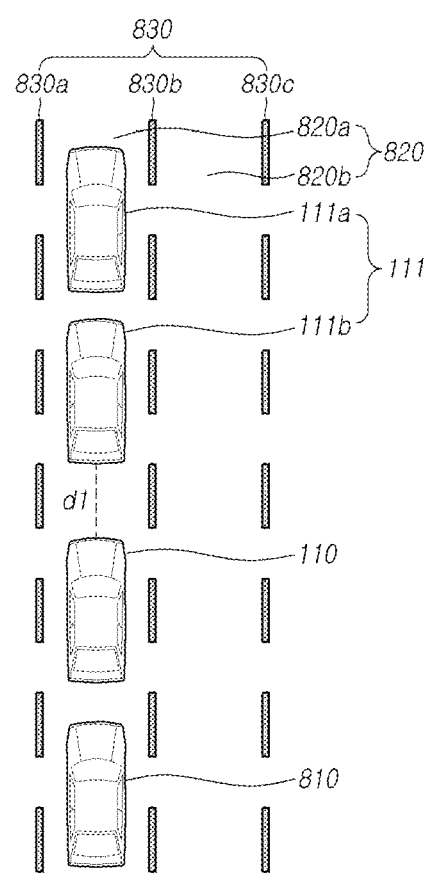

FIGS. 8A to 8C are diagrams illustrating the situation in which the host vehicle 110 equipped with the apparatus 200 according to an embodiment drives on a road, and the forward vehicle 111 and a rearward vehicle 810 drive in front of and behind the host vehicle 110.

Referring to FIG. 8A, if the apparatus 200 installed in the host vehicle 110 controls the speed of the host vehicle 110 such that the host vehicle 110 drives while maintaining the second inter-vehicle distance of d2 from the first vehicle 111a, in the same manner as the descriptions of FIG. 7A, the host vehicle 110 may collide with the rearward vehicle 810.

Therefore, referring to FIG. 8B, while the host vehicle 110 decelerates in order to realize the second inter-vehicle distance of d2, the apparatus 200 installed in the host vehicle 110 may change the inter-vehicle distance to the first vehicle 111a from the second inter-vehicle distance of d2 to a third inter-vehicle distance of d3, by taking into consideration the degree of the possibility of collision with the rearward vehicle 810.

The apparatus 200 installed in the host vehicle 110 controls the host vehicle 110 to decelerate such that the host vehicle 110 maintains the third inter-vehicle distance of d3, and may perform control to provide a warning sound to the rearward vehicle 810.

The host vehicle 110 drives while maintaining the third inter-vehicle distance of d3 from the first vehicle 111a until the second vehicle 111b completely cuts in.

The third inter-vehicle distance of d3 is determined by taking into consideration the possibility of collision with the second vehicle 111b and a collision with the rearward vehicle 810. Therefore, the third inter-vehicle distance of d3 may be calculated to be a value that falls in the range that is greater than the first inter-vehicle distance of d1 and less than the second inter-vehicle distance of d2.

Referring to FIG. 8C, if the second vehicle 111b completely cuts into the driving road 820a of the host vehicle 110, the apparatus 200 installed in the host vehicle 110 may change the object from which the host vehicle 110 is to maintain the inter-vehicle distance to the second vehicle 111b.

The apparatus 200 installed in the host vehicle 110 may control the host vehicle 110 to accelerate during a predetermined period of time, such that the host vehicle 110 can drive by decreasing the inter-vehicle distance to the second vehicle 111b to the set first inter-vehicle distance of d1.

If the inter-vehicle distance to the second vehicle 111b corresponds to the first inter-vehicle distance of d1, the apparatus 200 installed in the host vehicle 110 may control the speed of the host vehicle 110 in order to maintain the first inter-vehicle distance of d1.

Hereinafter, a method for controlling an inter-vehicle distance that may implement all of the present disclosure will be described.

Figure 9:
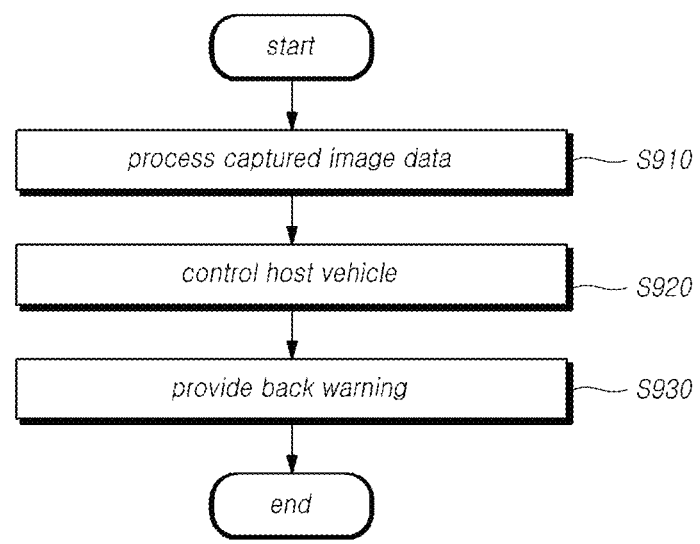
FIG. 9 is a flowchart illustrating a method for controlling an inter-vehicle distance according to an embodiment.
Figure 10:
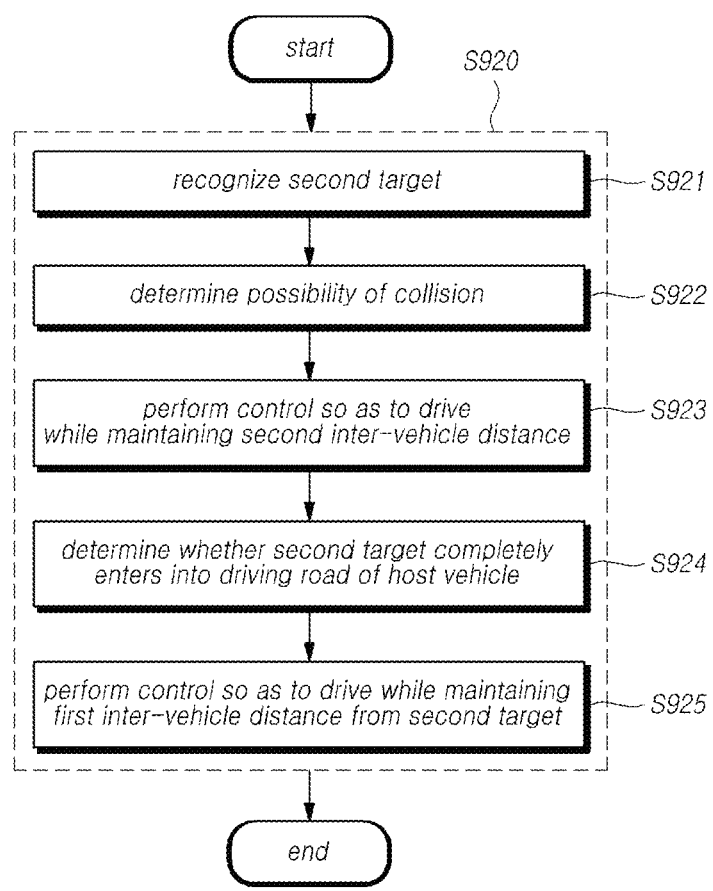
FIG. 10 is a flowchart specifically illustrating a method for controlling an inter-vehicle distance according to an embodiment.

FIG. 9 is a flowchart illustrating a method for controlling an inter-vehicle distance according to an embodiment. FIG. 10 is a flowchart illustrating an operation of controlling a host vehicle 110 in detail, which is included in the inter-vehicle distance control method according to an embodiment.

Referring to FIG. 9, a method for controlling an inter-vehicle distance according to an embodiment may include: operation S910, that captures image data using one or more the first sensors 210 mounted to the front side of a host vehicle 110 so as to have a field of view with respect to the inside or the outside of the host vehicle 110, and processes the captured image data; operation S920, that recognizes one or more forward targets 111 in front of the host vehicle 110, based on the image data processed by the first sensor 210, and controls the host vehicle 110 to drive while maintaining a predetermined first inter-vehicle distance from a first target 111a by selecting the first target 111a that precedes on the driving road of the host vehicle 110 from among the one or more forward targets 111.

Here, the inter-vehicle distance control method may further include operation S930 that provides a back warning while the first inter-vehicle distance is changed to a second inter-vehicle distance.

Here, the operation S920 that controls the host vehicle 110 may further perform a process of recognizing a rearward target 810 behind the host vehicle 110 from the result of processing the image data.

Hereinafter, the operation S920 that controls the host vehicle 110 will be described in detail.

Referring to FIG. 10, the operation S920 that controls the vehicle may include: operation S921 that recognizes, as a second target 111b, a target that cuts into the driving road 120a of the host vehicle 110 from among the one or more forward targets 111, operation S922 that determines the possibility of collision with the second target 111b, operation S923 that maintains the first target 111a as an object from which the host vehicle 110 is to maintain the inter-vehicle distance if there is the possibility of collision with the second target 111b, changes the inter-vehicle distance from the first inter-vehicle distance to a second inter-vehicle distance, which is greater than the first inter-vehicle distance, and controls the host vehicle 110 to drive while maintaining the second inter-vehicle distance from the first target 111a, operation S924, that determines whether the second target 111b has completely entered into the driving road 120a of the host vehicle 110 via lane change, and operation S925 that changes the object from which the host vehicle 110 is to maintain the inter-vehicle distance from the first target 111a to the second target 111b if the second target 111b has completely entered into the driving road 120a of the host vehicle 110, and controls the host vehicle 110 to drive while maintaining the predetermined first inter-vehicle distance from the second target 111b.

Here, the operation S920 that controls the host vehicle 110 may further perform a process of recognizing a rearward target 810 behind the host vehicle 110 from the result of processing the image data.

In this instance, the operation S922 that determines the possibility of collision with the second target 111b may further perform a process of determining the possibility of collision with the rearward target 810.

Also, the operation S923 that controls the host vehicle 110 to drive while maintaining the second inter-vehicle distance may further perform a process of correcting the second inter-vehicle distance based on the degree of the possibility of collision with the rearward target 810 and controlling the host vehicle 110 to drive while maintaining a third inter-vehicle distance from a first target 111a.

In this instance, the third inter-vehicle distance may be greater than the first inter-vehicle distance and less than the second inter-vehicle distance.

Figure 11:
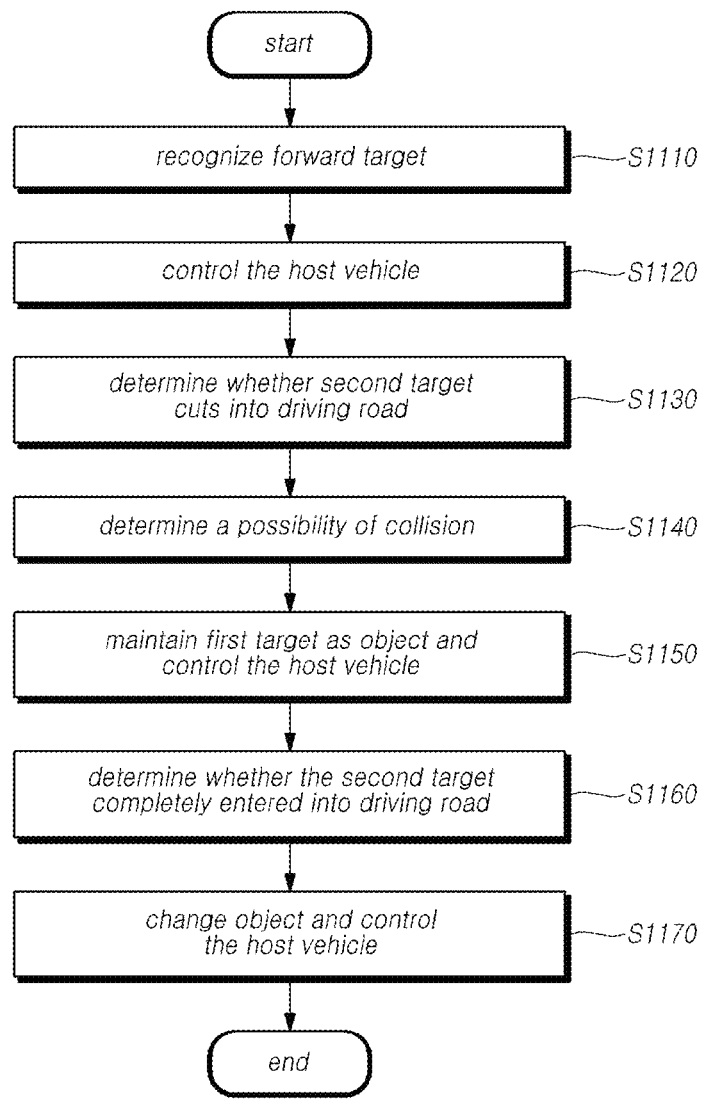
FIG. 11 is a flowchart illustrating a method for controlling an inter-vehicle distance according to another embodiment.

FIG. 11 is a flowchart illustrating a method for controlling an inter-vehicle distance according to another embodiment.

Referring to FIG. 11, a method for controlling an inter-vehicle distance according to another embodiment may include:

operation S1110 in which the controller 250 recognizes one or more forward targets 111 in front of a host vehicle 110 by capturing image data using a first sensor 210, operation S1120 in which the controller 250 controls the host vehicle 110 to drive while maintaining a predetermined first inter-vehicle distance from a first target 111a that precedes on a driving road 120a of the host vehicle 110 from among the one or more forward targets 111, operation S1130 in which the controller 250 determines whether a second target 111b from among the one or more forward targets 111 cuts into the driving road 120a of the host vehicle 110, operation S1140 in which the controller 250 determines a possibility of collision with the second target 111b, when the second target 111b cuts into the driving road 120a of the host vehicle 110, operation S1150 in which the controller 250 maintains the first target 111a as an object from which the host vehicle 110 is to maintain an inter-vehicle distance, and controls the host vehicle 110 to drive while maintaining a second inter-vehicle distance, which is farther than the first inter-vehicle distance, when the host vehicle 110 has the possibility of collision with the second target 111b, operation S1160 in which the controller 250 determines whether the second target 111b completely entered into the driving road 120a of the host vehicle 110 via lane change, and operation S1170 in which the controller 250 changes the object from which the host vehicle 110 is to maintain the inter-vehicle distance from the first target 111a to the second target 111b, and controls the host vehicle 110 to drive while maintaining the predetermined first inter-vehicle distance from the second target 111b, when the second target 111b completely entered into the driving road of the host vehicle 110.

Here, although not illustrated, the method may further include an operation of providing a back warning while the first inter-vehicle distance is changed to the second inter-vehicle distance.

Although not illustrated, the method may further include an operation in which one or more the second sensors 220 detect a rearward target 810 behind the host vehicle 110.

If the operation of sensing the rearward target 810 is further included, the operation S1140 that determines the possibility of collision with the second target 111b may further perform a process of determining the possibility of collision with the rearward target 810.

Also, the operation S1150 that controls the vehicle to drive while maintaining the second inter-vehicle distance may further perform a process of correcting the second inter-vehicle distance based on the degree of the possibility of collision with the rearward target 810, and controlling the vehicle to drive while maintaining a third inter-vehicle distance from a first target 111a.

As described above, the third inter-vehicle distance may be greater than the first inter-vehicle distance and less than the second inter-vehicle distance.

As described above, according to the present disclosure, there may be provided an apparatus and a method for controlling an inter-vehicle distance which may more stably perform longitudinal control of a vehicle while the vehicle is being driven.

Also, according to the present disclosure, there may be provided an apparatus and a method for controlling an inter-vehicle distance which may preemptively prevent a collision that may occur while a vehicle drives on a road.

Also, according to the present disclosure, there may be provided an apparatus and a method for controlling an inter-vehicle distance which may prevent a malfunction of an autonomous vehicle to which a smart cruise control system is applied.

Also, according to the present disclosure, rapid acceleration or deceleration of the speed of a vehicle, which may be attributable to a vehicle cutting in, may be prevented, whereby a driver may be provided with better riding comfort.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the embodiments disclosed in the present disclosure are intended to illustrate the scope of the technical idea of the present disclosure, and the scope of the present disclosure is not limited by the embodiment. That is, at least two elements of all structural elements may be selectively joined and operate without departing from the scope of the present disclosure. The scope of the present disclosure shall be construed on the basis of the accompanying claims in such a manner that all of the technical ideas included within the scope equivalent to the claims belong to the present disclosure.

What is claimed is:

1. An apparatus for controlling an inter-vehicle distance, the apparatus comprising:
    at least one of a first sensor or a second sensor mounted to a host vehicle to have a field of view with respect to an exterior of the host vehicle; and
    a controller communicatively connected to the at least one of the first sensor or the second sensor and configured to:
    recognize one or more forward targets in front of the host vehicle, based on at least one of an image data processed by the first sensor or a sensing data processed by the second sensor;
    control the host vehicle to drive while maintaining a predetermined first inter-vehicle distance from a first target that precedes on a driving road of the host vehicle from among the one or more forward targets;
    determine whether a second target from among the one or more forward targets cuts into the driving road of the host vehicle;
    if the second target cuts into the driving road of the host vehicle, determine a possibility of collision with the second target;
    if the host vehicle has the possibility of collision with the second target, maintain the first target as an object from which the host vehicle is to maintain an inter-vehicle distance, and control the host vehicle to drive while maintaining a second inter-vehicle distance, which is farther than the first inter-vehicle distance;
    determine whether the second target completely entered into the driving road of the host vehicle via lane change; and
    if the second target completely entered into the driving road of the host vehicle, change the object from which the host vehicle is to maintain the inter-vehicle distance from the first target to the second target, and control the host vehicle to drive while maintaining the predetermined first inter-vehicle distance from the second target.

2. The apparatus of claim 1, wherein the controller is configured to:
    determine a target that cuts into the driving road of the host vehicle from among the one or more forward targets, as the second target;
    determine the possibility of collision with the second target;
    maintain the first target as the object from which the host vehicle is to maintain the inter-vehicle distance, to change the first inter-vehicle distance to the second inter-vehicle distance and to control the host vehicle to drive while maintaining the second inter-vehicle distance from the first target, if the host vehicle has the possibility of collision with the second target;
    determine whether the second target completely entered into the driving road of the host vehicle via lane change; and
    change the object from which the host vehicle is to maintain the inter-vehicle distance from the first target to the second target and to control the host vehicle to drive while maintaining the predetermined first inter-vehicle distance from the second target if the second target completely entered into the driving road.

3. The apparatus of claim 1, wherein the controller provides a back warning while the first inter-vehicle distance is changed to the second inter-vehicle distance.

4. The apparatus of claim 1, wherein the controller recognizes a rearward target behind the host vehicle, based on at least one of the image data processed by the first sensor or the sensing data processed by the second sensor.

5. The apparatus of claim 4, wherein the controller is configured to:
determine a possibility of collision with the rearward target,
correct the second inter-vehicle distance based on a degree of the possibility of collision with the rearward target, and
control the host vehicle to drive while maintaining a third inter-vehicle distance from the first target.

6. The apparatus of claim 5, wherein the third inter-vehicle distance is greater than the first inter-vehicle distance and less than the second inter-vehicle distance.

7. The apparatus of claim 1, wherein the controller determines a target as the second target if one or more of front wheels of the target, which drives on a road adjacent to the driving road of the host vehicle, cross a line in a direction from the adjacent road to the driving road of the host vehicle.

8. The apparatus of claim 1, wherein the controller calculates an estimated time of collision with the second target, and if the estimated collision time corresponds to a predetermined condition, determines that the host vehicle has the possibility of collision with the second target.

9. The apparatus of claim 1, wherein the controller measures an overall length of the second target, and
changes the first inter-vehicle distance to the second inter-vehicle distance based on the measured overall length.

10. The apparatus of claim 1, wherein the controller determines whether the second target completely entered into the driving road, based on whether all front wheels and rear wheels of the entering target cross a line in a direction from an adjacent road which is adjacent to the driving road of the host vehicle, to the driving road of the host vehicle.

11. The apparatus of claim 1, wherein, if a blinker of a target, which drives on a road adjacent to the driving road of the host vehicle, is turned on, the controller determines the target of which the blinker is turned on as the second target.

12. The apparatus of claim 1, wherein, if a heading angle of a target, which drives on a road adjacent to the driving road of the host vehicle, is greater than or equal to a predetermined reference angle, the controller determines the target as the second target.

13. The apparatus of claim 1, wherein the controller calculates a transverse speed and a transverse travel distance of a target, which drives on a road adjacent to the driving road of the host vehicle, and determines the target of which the calculated transverse speed and the transverse travel distance satisfy a predetermined cut-in condition, as the second target.

14. A method for controlling an inter-vehicle distance, the method comprising:
recognizing, using a controller communicatively connected to a first sensor, one or more forward targets in front of a host vehicle by capturing image data using a first sensor;
controlling, by the controller, the host vehicle to drive while maintaining a predetermined first inter-vehicle distance from a first target that precedes on a driving road of the host vehicle from among the one or more forward targets;
determining, by the controller, whether a second target from among the one or more forward targets cuts into the driving road of the host vehicle;
when the second target cuts into the driving road of the host vehicle, determining, by the controller, a possibility of collision with the second target;
when the host vehicle has the possibility of collision with the second target, maintaining, by the controller, the first target as an object from which the host vehicle is to maintain an inter-vehicle distance, and controlling, by the controller, the host vehicle to drive while maintaining a second inter-vehicle distance, which is farther than the first inter-vehicle distance;
determining, by the controller, whether the second target completely entered into the driving road of the host vehicle via lane change; and
when the second target completely entered into the driving road of the host vehicle, changing, by the controller, the object from which the host vehicle is to maintain the inter-vehicle distance from the first target to the second target, and controlling, by the controller, the host vehicle to drive while maintaining the predetermined first inter-vehicle distance from the second target.

15. The method of claim 14, further comprising:
providing, by the controller, a back warning while the first inter-vehicle distance is changed to the second inter-vehicle distance.

16. The method of claim 14, further comprising:
recognizing, by the controller, a rearward target behind the host vehicle from the result of processing the image data.

17. The method of claim 16, further comprising:
determining, by the controller, a possibility of collision with the rearward target;
correcting, by the controller, the second inter-vehicle distance based on a degree of the possibility of collision with the rearward target; and
controlling, by the controller, the host vehicle to drive while maintaining a third inter-vehicle distance from the first target.

18. The method of claim 17, wherein the third inter-vehicle distance is greater than the first inter-vehicle distance and less than the second inter-vehicle distance.

* * * * *